United States Patent
Anvar et al.

(10) Patent No.: US 12,305,008 B2
(45) Date of Patent: May 20, 2025

(54) NON-DESTRUCTIVE METHOD FOR PRODUCING Ag/TiO$_2$ NANOCOMPOSITE INCLUDING CROCUS SATIVUS

(71) Applicants: Seyed AmirAli Anvar, Tehran (IR); Sara Allahyaribeik, Tehran (IR); Sima Moradi, Tehran (IR); Hamed Ahari, Tehran (IR); Mehdi Rahimian, Tehran (IR); Soroush Rahimian, Tehran (IR); Tugba Ozdal, Istanbul (TR)

(72) Inventors: Seyed AmirAli Anvar, Tehran (IR); Sara Allahyaribeik, Tehran (IR); Sima Moradi, Tehran (IR); Hamed Ahari, Tehran (IR); Mehdi Rahimian, Tehran (IR); Soroush Rahimian, Tehran (IR); Tugba Ozdal, Istanbul (TR)

( * ) Notice: Subject to any disclaimer, the term of this patent is extended or adjusted under 35 U.S.C. 154(b) by 12 days.

(21) Appl. No.: 18/321,395

(22) Filed: May 22, 2023

(65) Prior Publication Data
US 2024/0110023 A1    Apr. 4, 2024

Related U.S. Application Data

(60) Provisional application No. 63/411,167, filed on Sep. 29, 2022.

(51) Int. Cl.
| | | |
|---|---|---|
| C08J 5/00 | (2006.01) | |
| C08J 3/215 | (2006.01) | |
| C08J 5/18 | (2006.01) | |
| C08K 3/22 | (2006.01) | |
| C08K 3/28 | (2006.01) | |
| C08K 11/00 | (2006.01) | |
| C08L 3/02 | (2006.01) | |

(52) U.S. Cl.
CPC .............. *C08J 5/005* (2013.01); *C08J 3/215* (2013.01); *C08J 5/18* (2013.01); *C08K 3/28* (2013.01); *C08K 11/00* (2013.01); *C08L 3/02* (2013.01); *C08J 2303/04* (2013.01); *C08K 2003/2241* (2013.01); *C08K 2201/011* (2013.01); *C08K 2201/014* (2013.01)

(58) Field of Classification Search
CPC ............ C08K 11/00; C08K 2003/0806; C08K 2003/2237; C08K 2003/2241; C08J 5/18; C08L 3/02; C09D 103/02
See application file for complete search history.

(56) References Cited

U.S. PATENT DOCUMENTS

| 9,763,976 B1 * | 9/2017 | Obagi ................ A61K 38/4873 |
| 2013/0177504 A1 * | 7/2013 | Macoviak ................ C09D 7/66 |
| | | 424/617 |

FOREIGN PATENT DOCUMENTS

| PL | 241040 B1 * | 7/2022 |
| WO | WO-2023156818 A1 * | 8/2023 |

OTHER PUBLICATIONS

Abdalameer et al., "Ag/AgO nanoparticles: Green synthesis and investigation of their bacterial inhibition effects," Mat. Today: Proceedings 45, 5788-5792 (Year: 2021).*
Azizian-Shermeh et al., "Phytochemical investigation and phytosynthesis of eco-friendly stable bioactive gold and silver nanoparticles using petal extract of saffron (*Crocus sativus* L.) and study of their antimicrobial activities," Appl. Nanosci. 20, 2907-2920 (Year: 2020).*
Bagherzade et al., "Green synthesis of silver nanoparticles using aqueous extract of saffron (*Crocus sativus* L.) wastages and its antibacterial activity against six bacteria," Asian Pac. J. Tropical Biomed. 7(3), 227-233 (Year: 2017).*
Mousa Solgi, "Evaluation of plant-mediated Silver nanoparticles synthesis and its application in postharvest Physiology of cut Flowers," Physiol. Mol. Biol. Plants 20(3), 279-285 (Year: 2014).*
Partial machine translation of PL-241040-B1 (Year: 2022).*
Sharwani et al., "Sustainable fabrication of silver-titania nancomposites using goji berry (*Lycium barbarum* L.) fruit extract and their photocatalytic and antibacterial applications," Arabian J. Chem. 14, 103456 (Year: 2021).*

* cited by examiner

*Primary Examiner* — Kregg T Brooks
(74) *Attorney, Agent, or Firm* — Barry Choobin; Patent 360

(57) ABSTRACT

A nanocomposite film and a method of producing nanocomposite films. The method includes the steps of preparing an aqueous *Crocus sativus* extract; dropwise adding silver nitrate solution to a dispersion of titanium dioxide nanoparticles to obtain a mixture; and dropwise adding the aqueous *Crocus sativus* extract to the mixture with continuous stirring to obtain nanocomposite powder.

4 Claims, No Drawings

NON-DESTRUCTIVE METHOD FOR PRODUCING Ag/TiO$_2$ NANOCOMPOSITE INCLUDING CROCUS SATIVUS

CROSS-REFERENCE TO RELATED APPLICATIONS

This application claims priority from a U.S. Provisional Patent Appl. No. 63/411,167 filed on Sep. 29, 2022, which is incorporated herein by reference in its entirety.

FIELD OF INVENTION

The present invention relates to a method of producing nanocomposite films using saffron extract, and more particularly, the present invention relates to a non-destructive method for synthesizing Ag/TiO2 that includes saffron.

BACKGROUND

In the modern food industry, packaging is one of the important factors in maintaining the quality and safety of food products, in particular the shelf life of the food products. Biodegradable films have gained much attention in food packaging in recent years. Moreover, nanotechnology is widely used in many fields of food sciences such as food processing, packaging, and enrichment. The production of nanocomposite films which are multiphase materials with at least one nanoparticle is receiving considerable importance in food packaging. Most of the current research is focused on enhancing the performance of food films and coatings by adding antioxidants and antimicrobials. Silver in the form of nanoparticles is one of the most common and widely used inorganic antimicrobial active ingredients that is used in the production of nanocomposite coatings with antimicrobial properties. However, an industrial need is always there for improving the properties of food packaging for better shelf life of the food products. Moreover, a desire is also there for choosing naturally occurring substances in the food packaging.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a nanocomposite film containing Ag/TiO$_2$ and saffron extract.

In one aspect, disclosed is a method for producing nanocomposite starch-based films in two-phases. The first phase includes the steps: preparing a *Crocus sativus* extract; Preparing silver nanoparticles solution from saffron extract; and preparing Ag/TiO2 nanocomposite. The second phase includes the steps: nanocomposite dispersion in water for preparing the base film and preparing a film containing TiO2/Ag nanocomposite.

In one aspect, the saffron extract can be prepared using a magnetic heating stirrer.

In one aspect, the silver nanoparticles can be synthesized by reduction method using aqueous saffron extract. The amount of extract can be about 2%.

In one aspect, the reduction process can be evaluated by visual observation and UV-vis spectrophotometer absorption spectrum in the range of 300-600 nm. The formation of silver nanoparticles results in color changing from pale yellow to reddish brown.

In one aspect, disclosed is a method for producing Ag/TiO$_2$ nanocomposite by mixing TiO$_2$ with AgNO$_3$ and dropwise adding an aqueous extract of saffron under magnetic stirring at about 300 rpm for about 2 hours. The saffron extract can be about 20%. The formation of the nanocomposites can be characterized by UV-Vis, FTIR, XRD, EDS, and TEM techniques. Moreover, the nanocomposite can be further evaluated by antimicrobial tests, such as MIC and combined MIC and WD. The nanocomposite in powder form can be dried overnight at about 50° C.

In one aspect, the particle size and morphology of nanocomposites can be performed using a 200 QUANTA ESEM FEI scanning electron microscope.

DETAILED DESCRIPTION

The subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

In the following description, for purposes of explanation, specific details may be set forth in order to provide a thorough understanding of the subject innovation. It may be evident, however, that the claimed subject matter may be practiced without these specific details.

Disclosed are a nanocomposite film and a method for producing nanocomposite film that is based on Ag/Tio2 and *Crocus sativus* extract. *Crocus sativus* L. with the common name saffron is a terrestrial plant of the genus Iridaceae that is widely grown in the Middle East and Mediterranean areas. The use of saffron in Europe and the Orient is very widespread and it has been used as medicine, textile dye, perfume, and food products. The most important bioactive compounds of saffron are crocin, safranal, and picrocrocin, which have various benefits including anticancer, antioxidant, anti-depressant, anti-apoptotic, anti-cough, analgesic, anti-inflammatory and anti-thrombotic properties.

In one implementation, an aqueous extract of saffron flowers can be used as a reducing agent for producing silver nanoparticles. The aqueous saffron extract can be added to silver nitrate solution with constant stirring and at a predetermined temperature to obtain silver nanoparticles.

In one implementation, disclosed are a nanocomposite prepared from $TiO_2$ nanoparticles, silver nitrate solution, and aqueous saffron extract. To the $TiO_2$ nanoparticles dispersed in distilled water can be added silver nitrate solution slowly to obtain a mixture. To the mixture can be dropwise added aqueous saffron extract with constant stirring to obtain nanocomposite as solid mass that can be separated from the reaction mixture. The nanocomposite in powder form can be stored.

In one implementation, disclosed is a method for preparing a nanocomposite film using the above nanocomposite powder. The film can be a starch-based film suitable for packing food products. Corn starch can be used for preparing the disclosed film. Plasticizers such as glycerol can be used. Cornstarch can be added to deionized water along with glycerol as plasticizer with stirring to obtain a mixture. To the mixture can be added the nanocomposite powder and mixed. The mixture with the nanocomposite powder can be poured into prepared molds and then can be heated at predetermined temperature to obtain the nanocomposite film.

Example 1. Preparing Nanocomposite Powder

Step 1: Preparing *Crocus sativus* Extract

Dried saffron flowers (50 g) were added to 100 ml of double distilled water with stirring at 80° C. for 60 minutes. Magnetic stirrer was used. Thereafter, the sample was centrifuged at 7000 rpm for 15 minutes. The supernatant was obtained and filtered. The extract was stored at 4° C. until use.

Step 2: Preparing Silver Nanoparticles Solution with Saffron Extract

A solution of 18.9 mL silver nitrate ($AgNO_3$) in 35 ml distilled water was stirred at 80° C. for 10 minutes. Then 0.4 ml of aqueous saffron extract was added dropwise under magnetic stirring at a speed of 300 rpm for 2 hours. The reduction process of silver by the aqueous saffron extract was evaluated by two methods: visually monitored and Vis-UV spectrophotometer.

Step 3: Preparing Nanocomposite 2 g of $TiO_2$ nanoparticles was added to 64 ml of double distilled water. 37.6 ml AgNO3 (0.1 M) in molar rate of 5:10 and 15% relative to $TiO_2$ was added and stirred for 10 minutes at 80° C. Then 8 ml of saffron extract was added dropwise under magnetic stirring at a speed of 300 rpm and the mixture was stirred for about 2 hours. The resultant mixture was subjected to centrifugation at 10,000 rpm for 10 minutes. Supernatants were removed and washed three times with water and three times with ethanol. Nanocomposite solid phase was collected and dried overnight at 50° C. to obtain nanocomposite powder.

Example 2: Nanocomposites Characterization

The nanocomposites obtained above in Example 1 were characterized by UV-Vis, FTIR, XRD, EDS, TEM techniques and antimicrobial tests including MIC, MIC and WD were performed.

UV-Vis

The formation of silver nanoparticles was investigated by color change and Vis-UV spectroscopy. The absorption spectrum was measured in the range of 300-600 nm using a spectrophotometer (Hitachi, U-2900 in the range of 600-600 nm) because silver adsorption occurs in this range. On the other hand, the study of UV absorption in the range of 300-600 nm and the presence of a peak near 450 nm, which increased over time and remained constant after another 2 hours, showed a decrease in silver nitrate to silver nanoparticles, which showed the Plasmon resonance peak of the surface of silver nanoparticles at about 450 nm.

FTIR

The FTIR spectrum of the samples was recorded using the general attenuation (ATR) in the smart FUR method. The samples were applied directly to the ZnSe ATR cell and for each spectrum, 64 consecutive scans were used at an accuracy of −14 cm.

XRD Test

X-ray diffraction (XRD) was measured with a Phillips 1373 goniometer PW powder diffractometer equipped with a graphite monochrome crystal. X-ray wavelength was 0.01 and diffraction patterns of 20 were recorded in the range of (20-80) with a scan speed of 2 per minute.

EDS Test

In addition to XRD test, EDS test was taken to be more reliable. For analysis, X-rays were performed by electron microscopy (SEM FEI Quanta 200) on the samples at a voltage of 25 volts and a resolution of 129 for 21 seconds and the magnification was in the range of 20,000 times the analysis on the samples.

TEM

Particle size and morphology of biosynthetic nanocomposites are performed using a 200 QUANTA ESEM FEI scanning electron microscope made in the USA and elemental analysis of different phases observed in the images was examined by the 2017 Drift Silicon EDS EDAX detector made in the USA. The shape and size of nanoparticles using a transient electron microscope (TEM) was identified by the Philips EM208S microscope, which operates at an accelerator voltage of 100 KV.

Antimicrobial Activity

The antibacterial activity of the nanocomposite film was evaluated by broth micro dilution method and well diffusion method to determine MIC, MMC, and inhibition zone diameter against bacterial strains and fungi tested as standard include Gram-positive *Staphylococcus aureus* PTCC1112 (ATCC 6735) and Gram-negative *Escherichia coli* PTCC1330 (ATCC 8739), *Aspergillus Niger* and *Candida albicans* are lyophilized and prepared by the Scientific and Industrial Research Organization of Iran.

In the first stage, different ratios of $TiO_2$/Ag synthesized were prepared (5, 10, and 15%) for microbial testing and the best samples were selected that in relation to $TiO_2$/Ag, S3 sample (15%) yielded the best microbial answer and was selected as the main sample.

Example 3: Preparation of Nanocomposite Starch-Based Films Incorporating Saffron Extract Step 1: Nanocomposite Dispersion Method in Water 0.33 g of Ag/TiO2 nanocomposite powder prepared according to Example 1 was added to 16.5 ml of deionized water and sonicated for 10 minutes at 108 watts and then stirred for 6 hours at room temperature with a magnetic magnet at 400 rpm to prevent settling. The obtained nanocomposite dispersion was stored.

Step 2: Preparing the Base Film

Starch mixture was prepared by mixing corn starch granules (25 g), deionized water (600 ml) and glycerol as a plasticizer (20 ml). The mixture was stirred under magnetic magnet at 300 rpm for 30 min at 80° C. Then, the mixture was allowed to cool to ambient temperature and was gently stirred with a spatula to remove bubbles. Finally, 50 ml of materials was poured into the prepared molds with dimensions of 12×12 cm and placed in an oven at 80° C. for 15 h.

Step 3: Preparing a Film Containing Nanocomposite 25 g of corn starch granules with 600 ml of deionized water were stirred to completely dissolve the starch in water. After that, 20 ml of glycerol was added to the mixture as a plasticizer and at the same time it was stirred and reached a temperature of 80° C. Then, the nanocomposite dispersion was added to the mixture with different weight ratios (0.2, 0.5, 1, 2, 4 and 6%) drop by drop and stirred for 30 minutes at 80° C. at a speed of 300 rpm. The obtained slurry was cooled to room temperature and gently stirred with a spatula to remove the bubbles. Finally, the slurry was poured into prepared molds with dimensions of 12×12 $cm^2$ (all the prepared molds were filled with 50 ml of material) and placed in an oven at 80° C. for 15 hours. The obtained nanocomposite film was evaluated for antimicrobial properties.

Step 4: Preparing a Film Containing 2% $TiO_2$/Ag Nanocomposite 12 g of corn starch granules were added with 300 ml of deionized water to completely dissolve the starch in water. After that, 10 ml of glycerol was added to the mixture as a plasticizer and the mixture was stirred with magnetic magnet at 300 rpm for 30 min at 80° C. Then 12.6 ml of nanoparticle dispersion was added dropwise to the starch mixture and stirred with a magnetic magnet at 300 rpm for 30 minutes at 80° C. for 30 min. The slurry was cooled at ambient temperature and gently stirred with a spatula to remove bubbles. Finally, 50 ml of the slurry was poured into the prepared molds with dimensions of 12×12 cm and placed in an oven at 80° C. for 15 h.

Step 5: Preparing a Film Containing 4% $TiO_2$/Ag Nanocomposite 12 g of corn starch granules were added with 300 ml of deionized water to completely dissolve the starch in water. After that, 10 ml of glycerol was added to the mixture as a plasticizer and the mixture was stirred with magnetic magnet at 300 rpm for 30 min at 80° C. Then 25 ml of nanoparticles dispersion was added dropwise to the starch mixture and stirred with a magnetic magnet at 300 rpm for 30 minutes at 80° C. for 30 min. The slurry was cooled at ambient temperature and gently stirred with a spatula to remove bubbles. Finally, 50 ml of the slurry was poured into the prepared molds with dimensions of 12×12 cm and placed in an oven at 80° C. for 15 h.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A nanocomposite film produced by a method comprising:
    preparing an aqueous Crocus sativus extract;
    dropwise adding silver nitrate solution to a dispersion of titanium dioxide nanoparticles to obtain a mixture;
    dropwise adding the aqueous Crocus sativus extract to the mixture with continuous stirring to obtain nanocomposite powder;
    adding cornstarch to deionized water along with glycerol as plasticizer with continuous stirring to obtain a second mixture;
    adding the nanocomposite powder to the second mixture to obtain a third mixture; and
    forming the nanocomposite film using the third mixture.

2. The nanocomposite film according to claim 1, wherein the dispersion is of titanium dioxide nanoparticles in water.

3. A method of forming nanocomposite film, the method comprising:
    preparing an aqueous Crocus sativus extract;
    dropwise adding silver nitrate solution to a dispersion of titanium dioxide nanoparticles to obtain a mixture;
    dropwise adding the aqueous Crocus sativus extract to the mixture with continuous stirring to obtain nanocomposite powder;
    adding cornstarch to deionized water along with glycerol as plasticizer with continuous stirring to obtain a second mixture;
    adding the nanocomposite powder to the second mixture to obtain a third mixture; and
    forming the nanocomposite film using the third mixture.

4. The method according to claim 3, wherein the dispersion is of titanium dioxide nanoparticles in water.

\* \* \* \* \*